Jan. 13, 1942.  C. W. CLEMONS  2,269,844
WAFFLE IRON HINGE
Filed Oct. 21, 1940
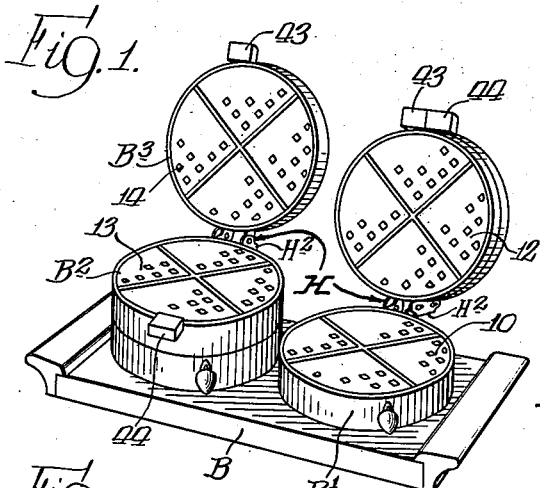
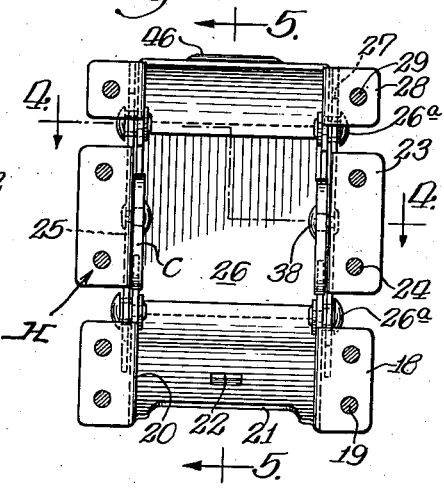
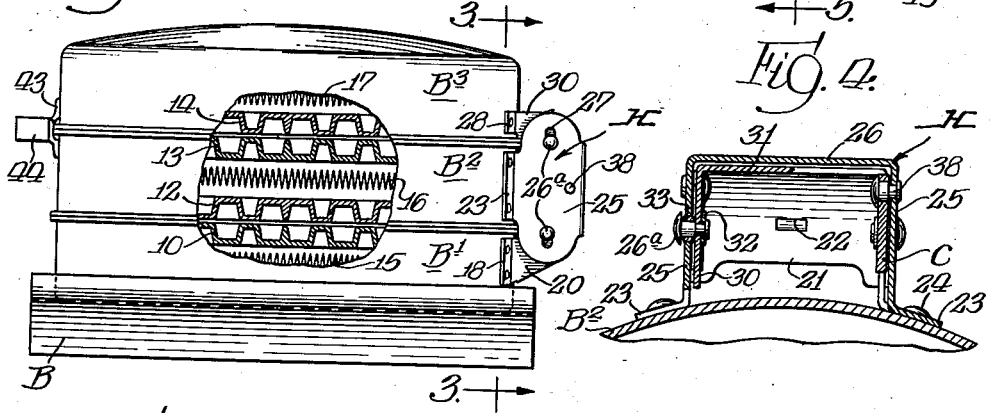
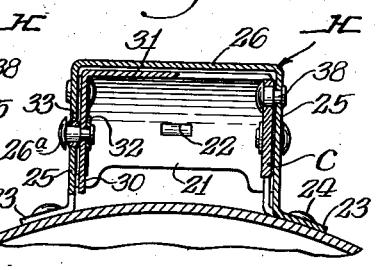
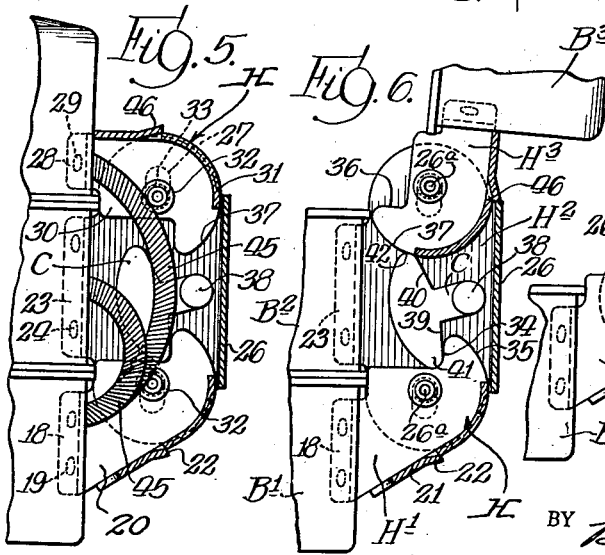
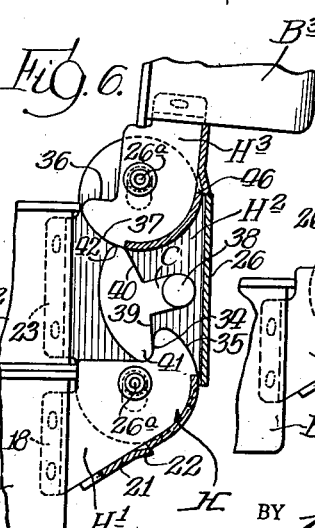
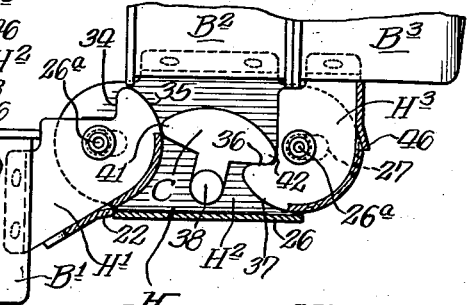
INVENTOR.
C. Wood Clemons,
BY Bair & Freeman
Attys.

Patented Jan. 13, 1942

2,269,844

UNITED STATES PATENT OFFICE 2,269,844

WAFFLE IRON HINGE

C. Wood Clemons, St. Louis, Mo., assignor to Knapp-Monarch Company, St. Louis, Mo., a corporation of Missouri Application October 21, 1940, Serial No. 362,162

8 Claims. (Cl. 53—10)

My invention relates to a hinge structure which is particularly adapted for waffle irons or the like wherein three or more superposed baking elements are provided.

One object of the invention is to provide a hinge of simple, durable and inexpensive construction for a waffle iron having at least three superposed baking elements.

Another object is to provide a hinge structure wherein hinge members are provided on a lower baking element, an intermediate baking element and an upper baking element, the hinge members being pivotally connected together and an arrangement of interlocking cam means being provided to prevent opening of the upper baking element relative to the intermediate baking element when the intermediate baking element is in open position relative to the lower baking element, or to prevent opening of the intermediate baking element relative to the lower baking element when the upper baking element is in open position relative to the intermediate baking element.

Another object is to design the hinge with its cam means enclosed within the shell of the hinge so that any wear of the parts thereof due to operation of such parts is concealed from view.

Still another object is to provide a hinge structure wherein it is necessary to provide only a pair of cam members in addition to the necessary upper, intermediate and lower hinge members, providing the upper and lower hinge members are properly shaped to coact with the cam members and accomplish the results desired.

A further object is to provide a hinge structure in which upper and lower hinge members are pivoted to an intermediate hinge member and are provided with hook shaped cams which are adapted to coact with a double hook shaped cam member pivoted to the intermediate hinge member to secure the results sought for and attained by my invention.

With these and other objects in view, my invention consists in the construction, arrangement and combination of the various parts of my device whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which Figure 1 is a perspective view of a waffle iron to which my invention has been applied;

Figure 2 is an end elevation of the waffle iron with parts shown in section to illustrate the type of waffle iron on which my hinge structure may be employed;

Figure 3 is an enlarged front elevation of the hinge structure per se;

Figure 4 is a sectional view on the line 4—4 of Figure 3;

Figure 5 is an enlarged sectional view on the line 5—5 of Figure 3 showing the baking elements of the waffle iron in closed position;

Figure 6 is a similar sectional view with the wire conduits omitted, showing the upper baking element open, and Figure 7 is a similar view showing the intermediate baking element open relative to the lower baking element.

On the accompanying drawing, I have used the reference character B to indicate a base, $B^1$ a lower baking element, $B^2$ an intermediate baking element and $B^3$ an upper baking element. The baking elements are illustrated as of the waffle iron type, although my invention is capable of application to other structures such as sandwich toasters and the like.

The baking element $B^1$ has a grid 10; the baking element $B^2$ has grids 12 and 13, and the baking element $B^3$ has a grid 14. The grids 10, 12, 13 and 14 may be heated as by heating elements 15, 16 and 17. It will be noted that the grids 12 and 13 are on the lower and upper faces of the intermediate baking element $B^2$ so that a waffle can be baked between the grids 10 and 12 and another one between the grids 13 and 14.

My hinge structure is shown generally at H. It comprises three members, i. e., a lower hinge member $H^1$, an intermediate hinge member $H^2$ and an upper hinge member $H^3$. The hinge member $H^1$ has a pair of flanges 18 adapted to be secured as by rivets 19 to the lower baking element $B^1$. From the inner edges of the flanges 18, rearwardly extending side flanges 20 are provided. The terminal edges of the flanges 20 are connected by a back wall 21. The wall 21 has a struck-out stop portion 22.

The intermediate hinge member $H^2$ consists of a pair of attaching flanges 23 secured to the baking element $B^2$ as by rivets 24. Along the inner edges of the flanges 23 are side flanges 25 connected together at their back edges by a back wall 26.

The hinge member H² is pivoted relative to the hinge member H¹ and the hinge member H³ is pivoted relative to the hinge member H² by means of rivets 26ᵃ passing through slots 27 of the side flanges 25 of the hinge member H². The hinge member H³, like the hinge member H¹, has attaching flanges secured as by rivets 29 to the upper baking element B³. The inner edges of the flanges 28 are connected with side walls 30 and the rear edges of the walls 30 are connected by a back wall 31. Two of the hinge rivets 26ᵃ extend through the flanges 20 and are riveted over washers 32. Rollers 33 are positioned on the pins or rivets 26ᵃ, and since the rivets are shouldered, binding of the rollers after the riveting operation is prevented.

The side flanges 20 of the hinge member H¹ have substantially vertical forwardly facing stop shoulders 34 and rearwardly and downwardly extending arcuate cam faces 35. Similarly, the upper hinge member H³ has a substantially vertical forward facing stop shoulders 36 and a rearwardly and upwardly curved arcuate cam surface 37 (considering the hinge member H³ is the normay position it assumes when the waffle iron is closed, as in Figure 5).

I provide a pair of cam members C pivoted as at 38 to the side flanges 25 of the intermediate hinge member H². The cam members C have substantially vertical cam faces 39 and 40, the terminal ends of which are indicated at 41 and 42 and constitute further cam surfaces. The various pivots 26 and 38 bear the relationship to each other illustrated in Figures 5, 6 and 7, and the stop shoulders and cam surfaces 34, 35, 36, 37, 39, 40, 41 and 42 are of the shape illustrated to accomplish the purposes attained by my construction.

*Practical operation*

In the operation of my hinge structure, the parts normally assume the position shown in Figure 5 when the waffle iron is closed. When it is desirable to open the upper baking element B³ relative to the intermediate baking element B², a handle 43 on the upper baking element B³ may be grasped and the upper baking element swung to the open position shown in Figure 6. Soon after the commencement of the opening movement, the arcuate cam surface 37 of the hinge member H³ will engage the cam surface 42 of the cam C so as to lock the baking element B² against being opened whenever the baking element B³ is opened. Referring to Figure 6, it is obvious that the element B² cannot be opened because it would effect a clockwise rotation of the intermediate hinge member H², which would attempt to swing the cam bodily clockwise about the lower pivot 26ᵃ. Engagement of the stop shoulder 34 with the cam surface 39 would prevent such movement.

When it is desirable to open the baking element B² relative to the baking element B¹, the element B³ must accordingly be closed first. The other handle 44 secured to the baking element B² may then be grasped and the element B² swung to the open position of Figure 7, carrying with it the element B³. It is now obvious that the arcuate cam surface 35 engaging the cam surface 41 of the cam C prevents the baking element B³ from opening relative to the baking element B². This is due to the engagement of the stop shoulders 36 and the cam surfaces 40 with each other. Thus, I have provided a hinge structure wherein only the lower and intermediate, or the intermediate and upper baking elements may be opened relative to each other but all of them cannot be opened at the same time. Those that are not opened are locked against opening until those that are open are again closed, and a very simple structure has been utilized to accomplish the results.

The hinge structure is designed so that it is U or channel shaped in cross section, as shown in Figure 4, and therefore provides between its side flanges plenty of room for electric wiring conduits 45 shown in Figure 5. The interior of the hinge is entirely free for the passage of the conduits and wires. At the same time I have provided only the two cam members C in addition to the three hinge parts to accomplish the desirable results of permitting opening of only one baking element at a time. In Figure 1, at the left side, the upper baking element is shown open, while at the right side the intermediate baking element is shown open.

In the open positions of the baking elements, it is desirable to provide stops of some character and accordingly I have provided the stop shoulder 22 for the intermediate baking element B² as in Figure 7, and a similar stop flange 46 for the baking element B³ when it is open, as in Figure 6. These stop flanges are merely punched from the material of the hinge members and bent outward slightly so as to engage the ends of the back wall 26 of the intermediate hinge element, thus limiting the hinge movement.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a hinge structure for waffle irons and the like having three superposed baking elements, a lower hinge member, an intermediate hinge member and an upper hinge member pivoted together, said lower hinge member having a substantially vertical forwardly facing stop shoulder and an arcuate surface extending rearwardly and downwardly therefrom, said upper hinge member having a substantially vertical forwardly facing stop shoulder and an arcuate surface extending rearwardly and upwardly therefrom, and a cam element pivoted to said intermediate member and having a pair of substantially vertical rearwardly facing cam surfaces for coaction with said forwardly facing stop shoulders and the terminal ends of said rearwardly facing cam surfaces cooperating with said arcuate surfaces to lock two of the hinge members relative to each other when the third one is in open position.

2. In a hinge structure for waffle irons and the like, lower, intermediate and upper hinge members pivoted together, said lower hinge member having a forwardly facing stop shoulder and an arcuate cam surface extending rearwardly and downwardly therefrom, said upper hinge member having a forwardly facing cam surface and an arcuate stop shoulder extending rearwardly and upwardly therefrom, and a cam element pivoted to said intermediate hinge member and having a pair of substantially vertical rearwardly facing cam surfaces for coaction with said forwardly facing stop shoulders with terminal ends of said rearwardly facing cam surfaces to cooperate with said arcuate cam surfaces.

3. In a hinge structure for a baking device having a plurality of superposed baking elements, a lower hinge member attached to the lower baking element and having a forwardly facing cam surface and an arcuate stop shoulder extending rearwardly and downwardly therefrom, an intermediate hinge member secured to another of said baking elements and having slot and pin connection with said lower hinge member, an upper hinge member secured to another of said superposed baking elements and having a forwardly facing stop shoulder and a rearwardly and upwardly curved arcuate cam surface, said upper hinge member being connected by a slot and pin connection to said intermediate hinge member, and a cam member pivoted to said intermediate hinge member and having a pair of cam surfaces to engage with said forwardly facing stop shoulders of said upper and lower hinge members with the terminal ends of said cam surfaces of said cam member coactible with the arcuate cam surfaces of said upper and lower hinge members.

4. In a hinge structure for waffle irons and the like having three superposed baking elements, a lower hinge member having an upright stop shoulder and an arcuate cam surface, an intermediate hinge member having slot and pin connection with said lower hinge member, an upper hinge member having slot and pin connection with said intermediate hinge member and having an upright stop shoulder and an arcuate cam surface, and a cam member pivoted to said intermediate hinge member and having a pair of cam surfaces to engage with said upright stop shoulders of said upper and lower hinge members, the terminal ends of said cam surfaces of said cam member being coactible with said arcuate cam surfaces of said upper and lower hinge members.

5. A hinge structure of the character described comprising a lower hinge member, an intermediate hinge member pivotally and slidably connected thereto, an upper hinge member pivotally and slidably connected to said intermediate hinge member, said upper and lower hinge members having cam elements, and a cam member pivoted to said intermediate hinge member and having cam lobes to coact with said cam elements of said upper and lower hinge members when the upper hinge member is moved to open position relative to the intermediate hinge member and to prevent relative hinging movement of the upper and intermediate hinge members when the intermediate hinge member is in open position relative to said lower hinge member.

6. A hinge structure for a plurality of superposed baking elements or the like comprising lower, intermediate and upper hinge members connected with the baking elements and pivotally connected with relation to each other, said upper and lower hinge members having hook shaped cams and a double hook shaped cam member pivoted to said intermediate hinge member to coact therewith and prevent relative hinging movement between two of said hinge members when the third one is in open position and to prevent relative hinging movement between the second and third ones when the second one is in open position relative to the first one.

7. A hinge structure for a waffle iron having a lower baking element, an intermediate baking element and an upper baking element comprising lower, intermediate and upper hinge members connected to the respective baking elements, said hinge members being pivotally connected together, and interlocking cam means interposed between said lower and intermediate hinge members and between said intermediate and upper hinge members and cooperating with means on the lower and upper hinge members to prevent said intermediate baking element from being opened relative to said lower baking element when said upper baking element is opened relative to said lower and intermediate baking elements, and to prevent said upper baking element from being opened relative to said intermediate from being opened relative to said intermediate baking element when said intermediate and upper baking elements are opened relative to said lower baking element.

8. A hinge structure for waffle irons and the like having lower, intermediate and upper baking elements, said hinge structure comprising three hinge members connected to the respective baking elements, said hinge members being pivotally connected together, and coacting interlocking stop shoulder and cam means on each hinge member, said means including stop shoulders on two of the hinge members and cam means pivotally connected with the third hinge member to prevent said intermediate baking element from being opened relative to said lower baking element by engagement of said cam means against certain of said stop shoulders when said upper baking element is opened relative to said intermediate and lower baking elements and for preventing said upper baking element from being opened relative to said intermediate baking element when said intermediate and upper baking elements are opened relative to said lower baking element.

C. WOOD CLEMONS.